United States Patent
Hicks et al.

(10) Patent No.: US 11,336,679 B2
(45) Date of Patent: May 17, 2022

(54) COMBINATORIAL TEST DESIGN FOR OPTIMIZING PARAMETER LIST TESTING

(71) Applicant: International Business Machines Corporation, Armonk, NY (US)

(72) Inventors: Andrew C. M. Hicks, Wappingers Falls, NY (US); Thomas William Conti, Poughkeepsie, NY (US); Bryan Childs, Poughkeepsie, NY (US); Michael Page Kasper, Poughkeepsie, NY (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 368 days.

(21) Appl. No.: 16/774,059

(22) Filed: Jan. 28, 2020

(65) Prior Publication Data
US 2021/0234883 A1    Jul. 29, 2021

(51) Int. Cl.
*H04L 9/40* (2022.01)
*H04L 29/06* (2006.01)
*G06N 5/04* (2006.01)

(52) U.S. Cl.
CPC .......... *H04L 63/1433* (2013.01); *G06N 5/04* (2013.01)

(58) Field of Classification Search
None
See application file for complete search history.

(56) References Cited

U.S. PATENT DOCUMENTS

| | | | |
|---|---|---|---|
| 5,551,013 A | 8/1996 | Beausoleil et al. |
| 5,574,873 A | 11/1996 | Davidian |
| 5,701,408 A | 12/1997 | Cornell et al. |
| 6,332,211 B1 | 12/2001 | Pavela |
| 6,883,034 B1 | 4/2005 | Pelavin et al. |
| 7,313,822 B2 | 12/2007 | Ben-Itzhak |
| 8,490,193 B2 | 7/2013 | Yamada et al. |
| 8,490,196 B2 | 7/2013 | Obes et al. |

(Continued)

FOREIGN PATENT DOCUMENTS

| | | |
|---|---|---|
| CN | 101655787 A | 2/2010 |
| CN | 105359157 A | 2/2016 |

(Continued)

OTHER PUBLICATIONS

"Z/OS MVS Programming: Extended Addressability Guide" Retrieved from https://www.ibm.com/support/knowledgecenter/en/SSLTBW_2.1.0/com.ibm.zos.v2r1.ieaa500/ieaa500141.htm, Sep. 25, 2018, 3 pages.

(Continued)

*Primary Examiner* — Cai Y Chen
(74) *Attorney, Agent, or Firm* — Cantor Colburn LLP; Teddi Maranzano

(57) ABSTRACT

A method includes receiving test objective data indicates an objective to be achieved during a cybersecurity test of a target system. An attack tree is generated by processing the test objective data into attack tree data including a plurality of data parameter sets and links between data parameter sets. Complexity of the attack tree is analyzed based on the test objective data using a combinatorics model. The attack tree is reduced to achieve the objective of the cybersecurity test based on the analyzed complexity of the attack tree.

20 Claims, 5 Drawing Sheets

(56) References Cited

U.S. PATENT DOCUMENTS

| | | |
|---|---|---|
| 8,583,899 B2 | 11/2013 | Ehrman et al. |
| 8,683,546 B2 | 3/2014 | Dunagan et al. |
| 8,918,885 B2 | 12/2014 | McClure et al. |
| 8,966,636 B2 | 2/2015 | Kalman et al. |
| 9,183,397 B2 | 11/2015 | Futoransky et al. |
| 9,183,560 B2 | 11/2015 | Abelow |
| 9,317,460 B2 | 4/2016 | Greiner et al. |
| 9,715,592 B2 | 7/2017 | Compagna et al. |
| 9,894,090 B2 | 2/2018 | Hebert et al. |
| 10,587,581 B2 | 3/2020 | Robertson |
| 11,128,654 B1 * | 9/2021 | Joyce ............... H04L 63/20 |
| 2011/0035803 A1 | 2/2011 | Obes |
| 2011/0061104 A1 | 3/2011 | Yamada et al. |
| 2014/0095556 A1 | 4/2014 | Lee et al. |
| 2014/0237606 A1 | 8/2014 | Futoransky et al. |
| 2016/0381050 A1 | 12/2016 | Shanbhogue et al. |
| 2017/0019421 A1 | 1/2017 | Hebert et al. |
| 2017/0271027 A1 | 9/2017 | Childs et al. |
| 2017/0346839 A1 * | 11/2017 | Peppe ............... G06F 21/552 |
| 2018/0032328 A1 | 2/2018 | Kannamparambil et al. |
| 2018/0157605 A1 | 6/2018 | Edwards et al. |
| 2018/0365428 A1 | 12/2018 | Edwards et al. |
| 2019/0036961 A1 | 1/2019 | Gorodissky et al. |
| 2019/0129620 A1 | 5/2019 | Hatsutori et al. |
| 2019/0163480 A1 | 5/2019 | Barrick et al. |
| 2019/0205136 A1 | 7/2019 | Hu et al. |
| 2019/0266331 A1 | 8/2019 | Sanchez Diaz et al. |
| 2019/0384918 A1 | 12/2019 | Ndu et al. |
| 2020/0012600 A1 | 1/2020 | Konoth et al. |
| 2020/0057664 A1 | 2/2020 | Durham et al. |

FOREIGN PATENT DOCUMENTS

| | | |
|---|---|---|
| CN | 110022311 A | 7/2019 |
| CN | 110213077 A | 9/2019 |
| CN | 110543761 A | 12/2019 |
| WO | 2008109770 A2 | 9/2008 |

OTHER PUBLICATIONS

C. Guo, et al., "An automated testing approach for inter-application security in Android," AST May 31-Jun. 7, 2014 Proceedings of the 9th International Workshop on Automation of Software Test, pp. 8-14.

C. Pacheco et al., "Randoop: feedback-directed random testing for Java," OOPSLA Oct. 2007 Companion to the 22nd ACM SIGPLAN Conference on Object-Oriented Programming Systems and Applications Companion, pp. 815-816.

List of IBM Patents or Patent Applications Treated as Related, Jan. 28, 2020, 2 pages.

P. Bisht, et al., "NoTamper: automatic blackbox detection of parameter tampering opportunities in web applications," CCS Oct. 2010 Proceedings of the 17th ACM Conference on Computer and Communications Security, pp. 607-618.

PTES Technical Guidelines, retrieved from the internet: http://www.pentest-standard.org/index.php/PTES_Technical_Guidelines#Creation_of_Attack_Trees, May 19, 2019, 150 pgs.

U.S. Appl. No. 16/148,092, filed Oct. 1, 2018, Entitled: Cyber Security Testing for Authorized Services, First Named Inventor: Michael P. Kasper.

U.S. Appl. No. 16/148,096, filed Oct. 1, 2018, Entitled: Cyber Security for Space-Switching Program Calls, First Named Inventor: Bryan Childs.

International Application No. PCT/IB2021/050392 International Search Report and Written Opinion dated Apr. 26, 2021, 10 pages.

Devanbu, et al. "Stack and queue integrity on hostile platforms," in IEEE Transactions on Software Engineering, vol. 28, No. 1, pp. 100-108, Jan. 2002, doi: 10.1109/32.979991. (Year: 2002).

* cited by examiner

US 11,336,679 B2

COMBINATORIAL TEST DESIGN FOR OPTIMIZING PARAMETER LIST TESTING

BACKGROUND

The present invention relates to computer systems, and more particularly, to combinatorial test design for optimizing parameter list testing.

In a computer system, a kernel is a core component of an operating system that handles various tasks, such as running processes, managing devices, handling interrupts, and the like. Some tasks are performed by the kernel responsive to a system call from a process, while other tasks are performed responsive to system conditions and system management logic. The kernel has access to a memory system of a computer and can control provisioning of the memory system to user processes and operating system processes. The kernel can support virtual addressing through grouping portions of memory into pages to make larger segments or frames of memory available and appear contiguous even if the underlying physical addresses of the memory are non-contiguous.

Authorized services, also known as kernel services or programs, can allow unauthorized programs to perform authorized functions. This typically requires the authorized program to verify input from an unauthorized program in order to maintain the integrity of the computer system. However, unauthorized programs can call authorized programs in unexpected ways, potentially causing an authorized program to bypass integrity checks of the computer system and violate system confidentiality, integrity, or availability.

Combinatorial Test Design (CTD) is a testing methodology that seeks to increase test space coverage for a System Under Test (SUT) through the use of automated algorithms. These algorithms identify input patterns that are most likely to locate problems in the SUT, thereby reducing the amount of time required for a tester to build test cases and an automation framework. CTD is well-adapted for projects that require numerous variations on static input vectors to properly test various system states and logic pathways, which would otherwise be extremely cumbersome for a human tester.

SUMMARY

According to a non-limiting embodiment, a method for optimizing parameter lists used for cybersecurity testing includes receiving test objective data. The test objective data indicates an objective to be achieved during a cybersecurity test of a target system. An attack tree is generated by processing the test objective data into attack tree data including a plurality of data parameter sets and links between data parameter sets. Complexity of the attack tree is analyzed based on the test objective data using a combinatorics model. The attack tree is reduced to achieve the objective of the cybersecurity test based on the analyzed complexity of the attack tree.

According to a non-limiting embodiment, a system includes a memory system and a processing system operably coupled to the memory system. The processing system is configured to perform operations including receiving test objective data. The test objective data indicates an objective to be achieved during a cybersecurity test of a target system. An attack tree is generated by processing the test objective data into attack tree data including a plurality of data parameter sets and links between data parameter sets. Complexity of the attack tree is analyzed based on the test objective data using a combinatorics model. The attack tree is reduced to achieve the objective of the cybersecurity test based on the analyzed complexity of the attack tree.

According to a non-limiting embodiment, a computer program product includes one or more computer readable storage media having program instructions embodied therewith. The program instructions are executable to perform a plurality of operations. The operations include receiving test objective data. The test objective data indicates an objective to be achieved during a cybersecurity test of a target system. An attack tree is generated by processing the test objective data into attack tree data including a plurality of data parameter sets and links between data parameter sets. Complexity of the attack tree is analyzed based on the test objective data using a combinatorics model. The attack tree is reduced to achieve the objective of the cybersecurity test based on the analyzed complexity of the attack tree.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

DETAILED DESCRIPTION

Figure 1:
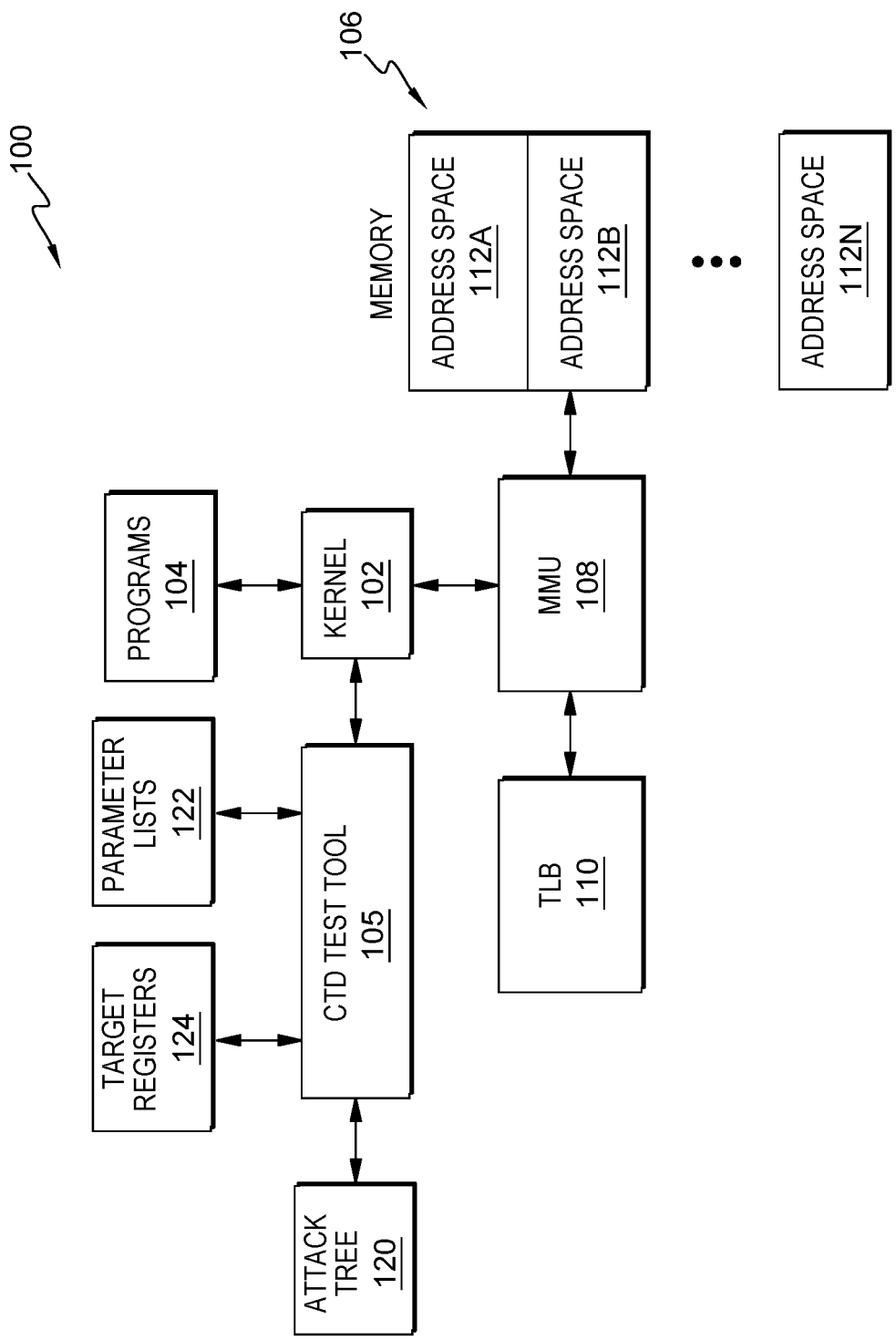
FIG. 1 is a block diagram of a target system according to a non-limiting embodiment of the invention.

Turning now to an overview of technologies that are more specifically relevant to aspects of the invention, authorized services, also known as kernel services or authorized programs, allow unauthorized programs to perform authorized functions. Authorized services are expected to verify input from an unauthorized program in order to maintain the integrity of a computer system; however, unauthorized programs can call authorized programs in unexpected ways. Malicious unauthorized programs may not rely on documented interfaces or intended uses of a service. Further, in some cases, documentation for valid parameter lists of an authorized service may not exist.

Testing tools need to determine meaningful input data to supply to an authorized service. Random data may often return the same results every time without exercising many code paths in the authorized service, because random data does not take advantage of the structures or parts of a parameter list. A service request may often be rejected for invalid parameters before reaching many sensitive areas of an authorized code path. For example, parameter lists often contain addresses or lists of addresses. The length of an address can be determined by an addressing mode in use.

Turning now to an overview of the aspects of the invention, one or more embodiments of the invention address the above-described shortcomings of the prior art by reducing test cases using combinatorial test design (CTD) and performing tests to target a protected storage location of memory. Test operations may be implemented to trigger a protection execution upon access. In this implementation, cybersecurity testing can be used to call an authorized service and verify whether the authorized service uses a selected target register. Cybersecurity testing involves gathering information about a target of the testing (e.g., a protected storage location of memory), identifying possible parameter lists, trying to break in through those parameter lists, and then reporting the finding of the test. This process can often expand to an excessively large set of tests to run. In order to optimally reduce the number of tests needed to be run on each program call, supervisor call, or branch, a combinatoric testing model is used by a test tool in various embodiments of the invention.

When cybersecurity testing code, one attack vector can focus on using a parameter list of a program to point off to different attack vectors (e.g., key 0, protected storage, write-protected storage, fetch protected storage, and other such examples). By performing an operation to target a protected storage location of memory which triggers a protection exception upon access, the authorized service can be called to verify that the authorized service uses a target register selected as part of the test. This process can often expand to an excessively large set of tests to run, due to the number of permutations available. As the number of subsequent parameters increases, the problem can expand with exponential growth. By applying combinatoric processing, the number of tests needed to be run can be reduced on each program call, supervisor call, or branch. The reduction can result in liner time to run the testing for a desired time period or level of test coverage rather than the potential exponential time of unconstrained testing. The combinatorial reduction can be implemented, for example, by using binary decision trees and coverage arrays to model the parameter list as the parameter list is being discovered. Parameters can be selected based on a historical regression tree built in a discovery process.

Example embodiments of the invention relate to, among other things, devices, systems, methods, computer-readable media, techniques, and methodologies for assigning test case priorities for testing performed on a system under test (SUT), also referred to as a target system, through test case generation from combinatoric outputs using a CTD model. The SUT may be a hardware system or a software system. In example embodiments, before each test case generation, a set of test vectors can be generated that provides complete pairwise (or greater) coverage of a test space. A model of the test space, herein referred to as the model or CTD model, may be useful for assisting in test planning, coverage analysis, or other test related activities. The model may define tests that are within the test space, based on any aspect of the tests, such as but not limited to inputs, scenarios, configurations, or the like. The model can include a set of functional attributes, respective domains of values for each attribute, and potentially restrictions on the value combinations. Each attribute may relate to a different aspect of a test, such as, for example, an operation to be performed, input to be provided, or the like. Each test is represented by a valuation to each of the attributes of the model that together define the functionality of the test. The model may be used to identify redundant tests, to identify missing tests or aspects of the target system that are uncovered by the test suite, or the like.

In example embodiments, inputs to the SUT can be modeled as a collection of attribute-value pairs or other groupings. More specifically, inputs to the SUT can be modeled as a collection of attributes, each of which is eligible to take on one or more corresponding attribute values to form attribute-value pairs. In example embodiments, the entire Cartesian product space that contains all possible combinations of attribute-value pairs can be reduced to a smaller set of test vectors that provides complete pairwise coverage of the test space across all attribute values. For instance, if it is assumed that four different attributes A, B, C, and D are modeled, and if it is further assumed that attribute A can take on four distinct values; attribute B can take on three distinct values; attribute C can take on three distinct values; and attribute D can take on two distinct values, then the total number of unique combinations of attribute values would be 4*3*3*2=72. Thus, in this illustrative example, the entire Cartesian product space would include 72 different combinations of attribute values. As previously noted, these 72 different combinations can be reduced down to a smaller set of combinations that still provide complete pairwise coverage of the Cartesian product space. For instance, the 72 different combinations can be reduced down to 12 distinct combinations that together include every possible pairwise interaction of attribute values. It should be appreciated that an initial set of test vectors that provides complete m-wise coverage across the attribute values can also be generated (where m>2) but would require a greater number of test vectors that increases logarithmically as m increases. In order to achieve complete n-wise coverage across all attribute values (where n represents a total number of attributes modeled), a set of test vectors containing all possible combinations of attribute values in the Cartesian product test space would need to be generated.

In example embodiments, the entire Cartesian product space including all combinations of attribute values can be reduced down to a set of CTD test vectors that provides complete pairwise coverage across all attribute values. In example embodiments, this initial set of CTD vectors provides partial but not complete m-wise coverage of the test space, where $2<m\leq n$, and n represents the total number of attributes being modeled. For instance, an initial set of CTD vectors may provide 10% 3-wise coverage of the test space, 5% 4-wise coverage of the test space, and so forth. In example embodiments, the amount of m-wise coverage provided by a given set of CTD vectors that provides complete pairwise coverage progressively decreases as m increases.

In example embodiments, a binary decision tree or the like may be used to perform the reduction and identify the reduced set of CTD vectors that provides complete pairwise coverage and partial m-wise coverage, where $2<m\leq n$. In example embodiments, each CTD test vector that is generated includes a unique combination of attribute values, and the set of CTD test vectors together includes every possible pairwise interaction of attribute values and some portion of all possible m-wise interactions. In particular, each CTD vector may have a dimension corresponding to the number of attributes that are modeled, where each element of the CTD vector is a respective attribute value for a corresponding attribute. The set of CTD vectors that is generated, however, may not be unique. That is, in example embodiments, multiple different sets of CTD vectors, each of which provides complete pairwise coverage, can be generated. In the context of vulnerability and cybersecurity testing of an authorized service, the binary decision tree can be referred to as an attack tree.

In example embodiments, once the initial set of CTD test vectors is generated, it can be used to generate a corresponding set of test cases. For instance, the set of CTD test vectors may be provided as input to a test case generation tool configured to generate a respective corresponding test case for each CTD vector. Each test case may be designed to test the interactions among the particular combination of attribute values contained in the corresponding CTD vector. In example embodiments, the test cases are then executed as calls to authorized services, for instance.

Example embodiments of the invention include various technical features that yield technical effects that provide various improvements to computer technology. For instance, example embodiments of the invention include the technical feature of generating a set of test vectors and corresponding sets of test cases that provide coverage of a test space. The technical feature of reducing test cases enables higher accuracy and more complete test coverage of authorized services on a targeted system.

Turning now to a more detailed description of aspects of the present invention, FIG. 1 depicts a block diagram of a target system 100 that can be part of a memory management system of a computer system 10 of FIG. 1. The target system 100 can include a kernel 102 of an operating system (OS). The kernel 102 can enable provisioning of resources of the target system 100 to support execution of a plurality of programs 104. The kernel 102 may execute directly on a processing system or as part of a virtual machine when supported by a hypervisor, for example. The kernel 102 can access memory 106 through a memory management unit 108. The memory management unit 108 can divide the memory 106 into a plurality of pages addressed through virtual memory addressing. The memory management unit 108 can use a translation lookaside buffer 110 or other structure to support mapping of virtual page addresses to actual (e.g., physical or effective) page addresses in the memory 106. The memory 106 may be subdivided into a plurality of address spaces, such as address space 112A, address space 112B, and address space 112N that each have different access permissions. For example, some programs 104 may normally be limited to accessing the address space 112A, while the other programs 104 may normally be limited to accessing the address space 112B. Where address space switching is supported, one of the programs 104 of address space 112A may call one of the programs 104 of address space 112B, where access constraints are expected to limit permissions of the program 104 of address space 112A in address space 112B.

A CTD test tool 105 can be executed that tests for security vulnerabilities related to access constraints and other security concerns. The CTD test tool 105 can access an attack tree 120 to test one or more authorized services of the kernel 102 and/or programs 104, for instance, to identify potential vulnerability to a cyber-attack. The attack tree 120 can define test cases based on test vectors in coordination with one or more parameter lists 122 and target registers 124. The attack tree 120 can include attack tree data that defines a plurality of data parameter sets and links between data parameter sets as sequences for the parameter lists 122 and/or target registers 124.

In example embodiments, the CTD test tool 105 can use a discovery process to determine which registers of the target registers 124 point to parameter data, such as parameter lists 122. By obtaining a pointer to a first protected storage location of the memory 106 that will cause a protection exception when read or overwritten, and setting a target register 124 to point to the first protected storage location, address effects can be isolated from other target registers 124 that do not point to the first protected storage location. Instead, the other target registers 124 can be initialized to contain expected constant values or pointers to data that does not cause a protection exception. If no protection exception occurs, the contents of the target register 124 or data at locations pointed to by the target register 124 can be modified. Further, the other target registers 124 or data pointed to by the other target registers 124 can be modified. If a sufficient number of possible values are exhausted but no protection exception has occurred, it is likely that the target register 124 does not contain a pointer to an address being used as a parameter by an authorized service. After testing every one of the target registers 124 this way, the CTD test tool 105 can identify a list of the target registers 124 used as input to the authorized service.

If the CTD test tool 105 discovers that a target register 124 holds a parameter address because a protection exception occurred for the address supplied in the target register 124, then the CTD test tool 105 can seek to determine parameter characteristics. For example, in 64-bit addressing mode, the CTD test tool 105 can obtain 200 bytes of storage, enough for 25 parameters of 8 bytes each. Leaving the values of the other target registers 124 constant at first, or possibly varying them later, the CTD test tool 105 can set all 25 parameters (e.g., of parameter list 122) to either contain constant values or pointers to valid storage, such as parameter areas in memory 106. One-by-one, the CTD test tool 105 can set one 8-byte parameter at a time to point to a second protected storage location that will cause a protection exception. When a protection exception occurs at an address after calling the authorized service with the parameter list 122, the CTD test tool 105 can confirm identification of a parameter address in the parameter list 122 pointed to by the target register 124. Going through all of the parameter lists 122, one parameter at a time, the CTD test tool 105 can build a list or map of which parameters contain addresses. In 32, 31, or 24-bit addressing mode, 4-byte parameters could be used instead, for example.

Once a list of parameters is found that contains addresses or additional parameters, the CTD test tool 105 can map constraints of the parameter lists 122 and target registers 124 to construct a testing profile of discovered relationships and extend testing of the authorized service to additional levels of parameters. Since a large number of permutations is possible as parameter variations are explored, the CTD test tool 105 can apply a reduction process to reduce complexity of the attack tree 120 as further described herein.

Figure 2:
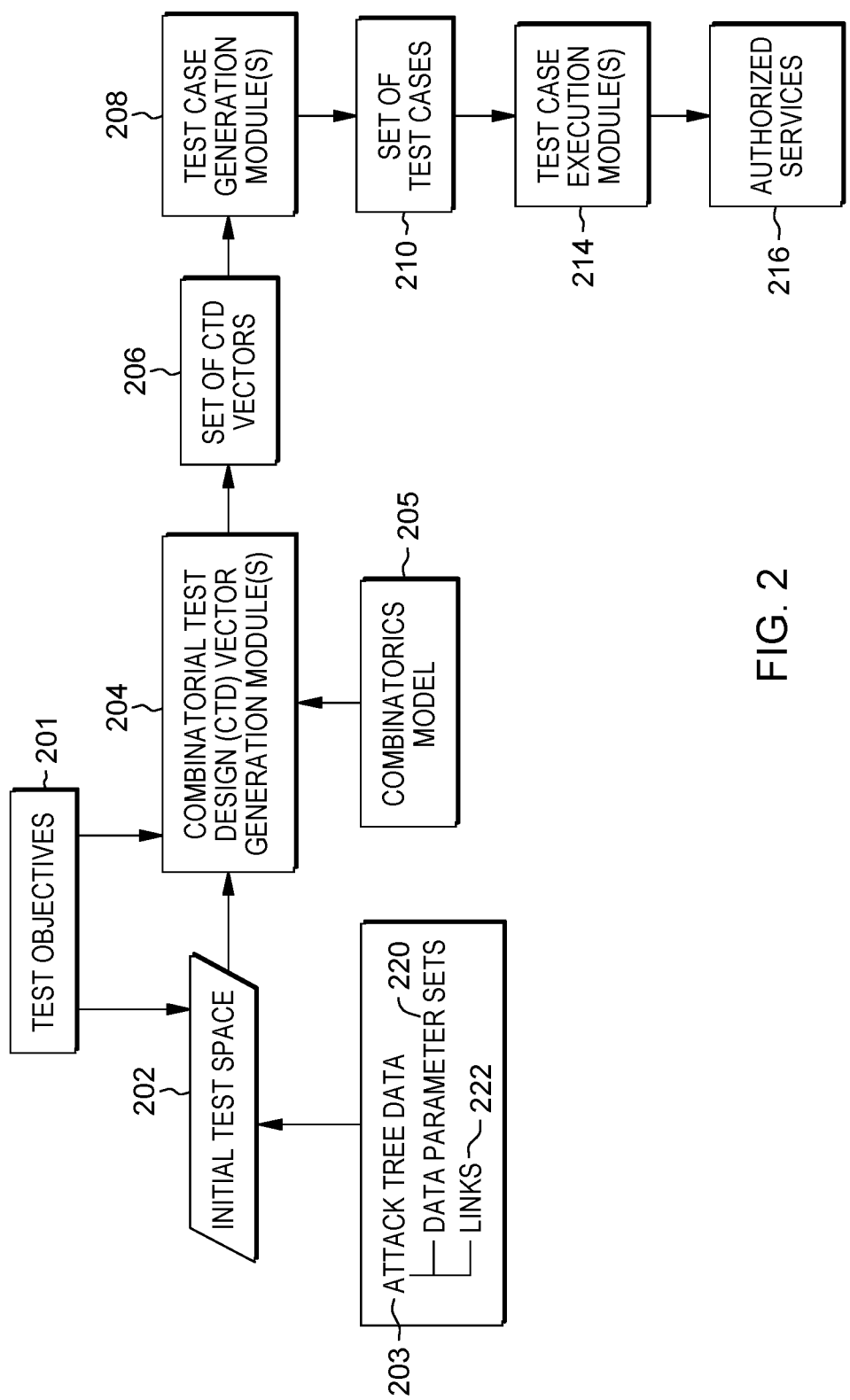
FIG. 2 is a schematic hybrid data flow/block diagram illustrating test case generation for optimized parameter list testing in accordance with one or more example embodiments of the invention.
Figure 3:
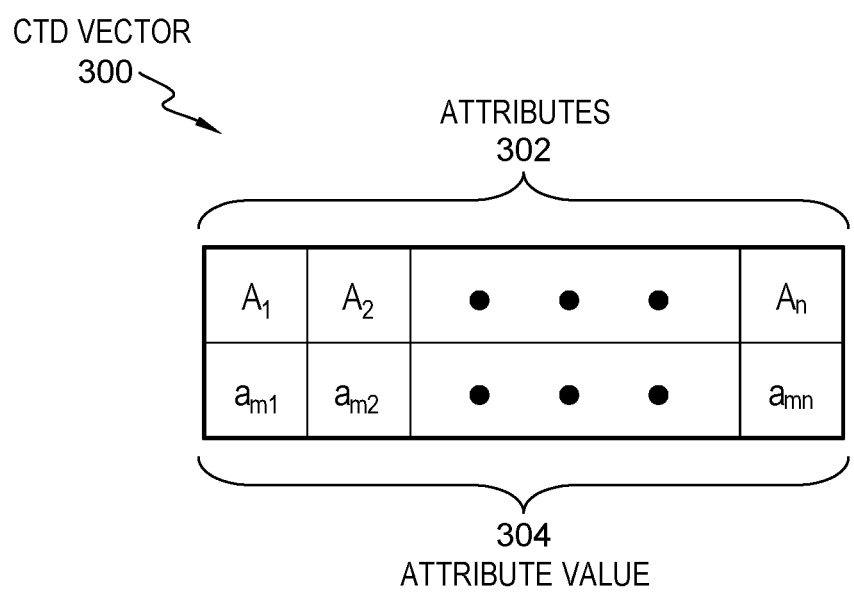
FIG. 3 is a schematic diagram of an example combinatorial test design vector in accordance with one or more example embodiments of the invention.
Figure 4:
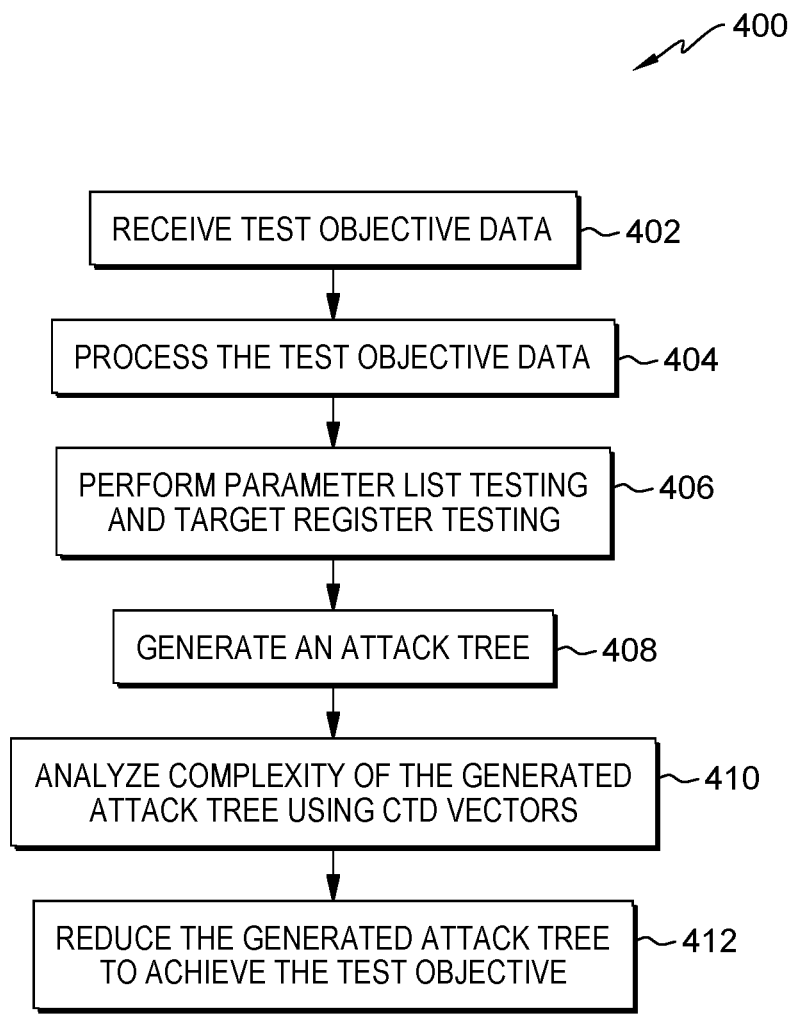
FIG. 4 is a flow diagram of an illustrative method for optimizing parameter lists used for cybersecurity testing in accordance with one or more example embodiments of the invention.
Figure 5:
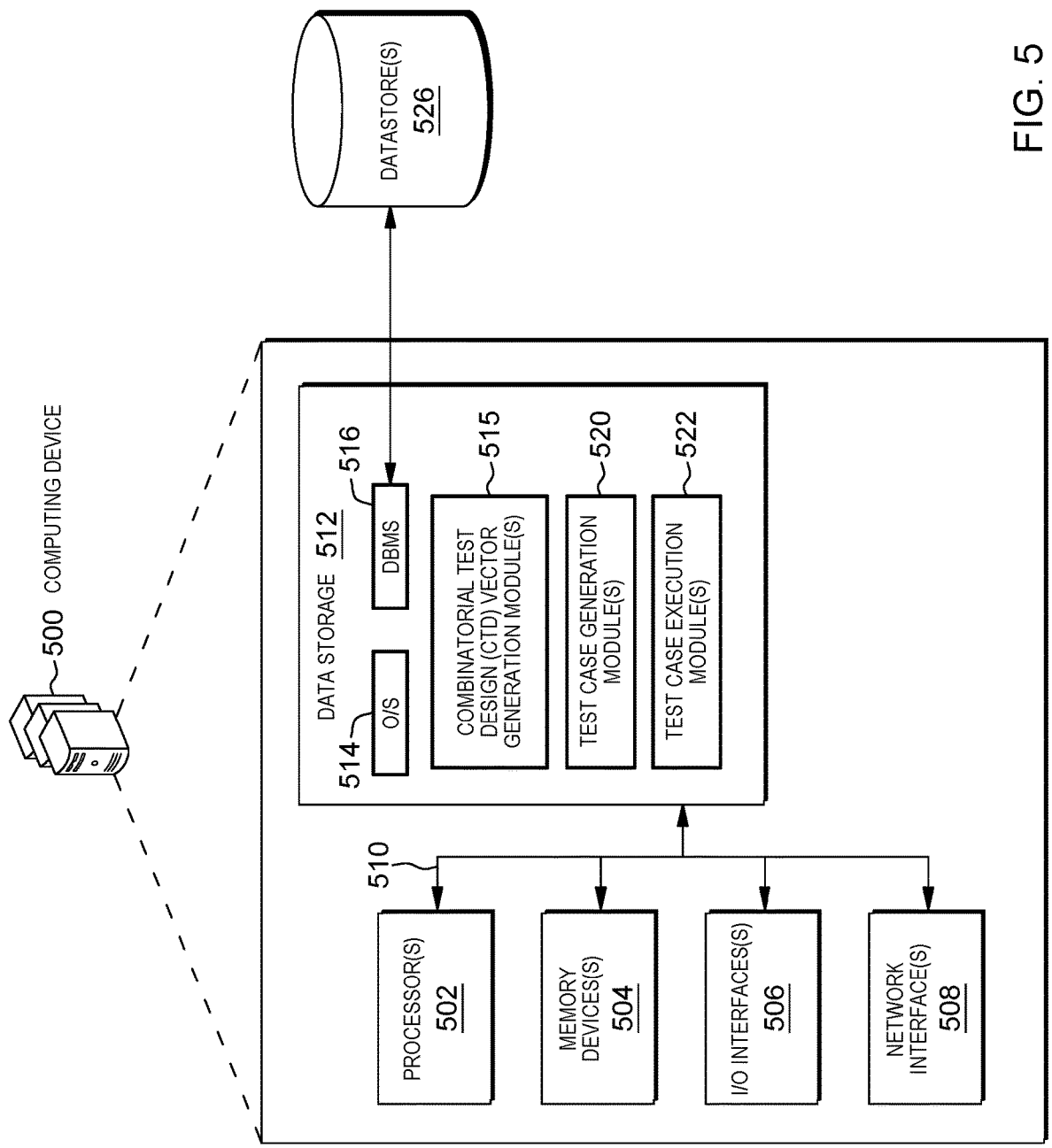
FIG. 5 is a schematic diagram of an illustrative computing device configured to implement one or more example embodiments of the invention.

FIG. 2 is a schematic hybrid data flow/block diagram illustrating test case generation from combinatoric outputs in accordance with one or more example embodiments of the invention. FIG. 3 is a schematic diagram of an example CTD vector. FIG. 4 is a process flow diagram of an illustrative method 400 for optimizing parameter lists used for cybersecurity testing in accordance with one or more example embodiments of the invention. FIG. 5 is a schematic diagram of an illustrative computing device that will be described in conjunction with FIGS. 1-4 hereinafter.

Illustrative methods in accordance with example embodiments of the invention and corresponding data structures (e.g., program modules) for performing the methods will now be described. It should be noted that each operation of the method 400 depicted in FIG. 4 may be performed by one or more of the program modules or the like depicted in FIG. 2 or FIG. 5, whose operation will be described in more detail hereinafter. These program modules may be implemented in any combination of hardware, software, and/or firmware. In certain example embodiments, one or more of these program modules may be implemented, at least in part, as software and/or firmware modules that include computer-executable instructions that when executed by a processing circuit cause one or more operations to be performed. A system or device described herein as being configured to implement example embodiments may include one or more processing circuits, each of which may include one or more processing units or nodes. Computer-executable instructions may include computer-executable program code that when executed by a processing unit may cause input data contained in or referenced by the computer-executable program code to be accessed and processed to yield output data.

Referring now to FIG. 4 in conjunction with FIGS. 1-3 and 5, at block 402 of the method 400, in example embodiments, test objective data 201 is received by the CTD test tool 105. The test objective data 201 can indicate an objective to be achieved during a cybersecurity test of the target system 100. The objective can be modeled as a collection of attribute-value pairs. More specifically, inputs to authorized services 216 can be modeled as a collection of attributes, each of which is eligible to take on one or more corresponding attribute values to form attribute-value pairs or other groupings. In example embodiments, the collection of all possible unique combinations of attribute values represents an entire Cartesian product space. In certain example embodiments, the entire Cartesian product space represents an initial test space 202. The test objective data 201 can also define constraints on test formation, such as a maximum depth for parameter list depth testing, and other such constraints.

At block 404 of the method 400, in example embodiments, the CTD test tool 105 can process the test objective data 201 to further determine initial constraints on the initial test space 202 during a discovery process and to further limit generation and/or reduction of a set of CTD vectors 206 by a CTD vector generation module 204 during a generation and reduction process. The discovery process can include performing parameter list testing and target register testing for a plurality of locations in the parameter lists 122 and a plurality of target registers 124 in block 406, with the results used to generate the attack tree 120 at block 408. The CTD test tool 105 can generate the attack tree 120 by processing the test objective data 201 into attack tree data 203 that includes a plurality of data parameter sets 220 and links 222 between the data parameter sets 220. The links 222 can define relationships or sequences of values in the data parameter sets 220 to reach a test state. Generation of the attack tree 120 can include performing parameter list depth testing progressively through a plurality of nested levels of parameter areas in the memory 106. The parameter list depth testing can be limited to a maximum depth included in the test objective data 201. The attack tree data 203 can be reorganized as a more efficient structure as the attack tree 120, which can be in a binary tree format indicating a combination and sequence of parameters for parameter lists 122 and target registers 124. A parameter list length of the parameter lists 122 can be limited to a maximum length included in the test objective data 201.

As a result of the discovery process, the initial test space 202 can be populated with all valid combinations of attribute values, which can be further reduced by the CTD vector generation module 204 to a smaller set of CTD vectors 206 that provides complete coverage across a plurality of attribute values. More specifically, in example embodiments, computer-executable instructions of the CTD vector generation module 204 are executed at block 410 to analyze the complexity of the attack tree 120 based on the test objective data 201 using a combinatorics model 205. The combinatorics model 205 can be a CTD model that defines, for example, inputs, scenarios, configurations, functional attributes, respective domains of values for each attribute, and/or potentially restrictions on the value combinations. The attack tree 120 can include a combination of two or more attack vectors for attacking the authorized services 216 of the target system 100. The CTD vector generation module 204 can reduce the attack tree 120 at block 412 to achieve the objective of a cybersecurity test based on the analyzed complexity of the attack tree 120 and generate the set of CTD vectors 206, which provides coverage with a substantially reduced number of test vectors as compared to the total number of valid combinations of attribute values in the initial test space 202. Analyzing the complexity if the attack tree 120 can include analyzing at least one of a depth of the attack tree 120, analyzing a breadth of the attack tree 120, and analyzing a shape of the attack tree 120. The CTD vectors 206 can represent contents of the attack tree 120 in a vector form to establish attribute values and sequences to support cybersecurity testing with robust coverage across multiple attributes. Reducing the attack tree 120 can reduce the number of tests needed to be run on each program call, supervisor call, or branch associated with one or more of the plurality of authorized services 216.

For instance, if it is assumed that four different attributes A, B, C, and D are modeled, and if it is further assumed that attribute A can take on four distinct values; attribute B can take on four distinct values; attribute C can take on three distinct values; and attribute D can take on two distinct values, then the total number of unique combinations of attribute values would be 4*4*3*2=96. Thus, in this illustrative example, the entire Cartesian product space would include 96 different unique combinations of attribute values. The initial test space 202 may include all 96 combinations or a lesser number if any combination(s) is excluded that violates an architectural restriction on the SUT. At block 412 of the method 400, the total number of combinations in the initial test space 202 can be reduced down to a smaller set of combinations that still provide complete pairwise coverage of the test space. For instance, the 96 different combinations can be reduced down to 16 distinct combinations included in the set of CTD vectors 206 that together include every possible pairwise interaction of attribute values.

In example embodiments, a binary decision diagram or the like may be used to perform the reduction and identify the reduced set of CTD vectors 206 that provides complete pairwise coverage and partial m-wise coverage, where $2 < m \leq n$ . . . . In example embodiments, each CTD test vector that is generated includes a unique combination of attribute values, and the set of CTD test vectors together includes every possible pairwise interaction of attribute values and some portion of all possible m-wise interactions. In particular, each CTD vector may have a dimension corresponding to the number of attributes that are modeled, where each element of the CTD vector is a respective attribute value for a corresponding attribute.

FIG. 3 depicts an example generic CTD vector 300 of the type that may be included in the set of CTD vectors 206 of FIG. 2. The example CTD vector 300 includes a plurality of attributes 302. As previously described, the attributes 302 may be used to model inputs to a SUT, such as authorized services 216. The attributes 302 may be associated with attribute values 304. In particular, each attribute 302 may have a corresponding attribute value 304, which may be one of one or more candidate attribute values that the attribute is allowed to take on.

Referring again to FIG. 2, in example embodiments, computer-executable instructions of one or more test case generation modules 208 may be executed to generate, from the initial set of CTD vectors 206, a corresponding set of test cases 210, which are then executed by the test case execution module(s) 214 calling authorized services 216 to yield an execution result (pass or fail) for each test case. For instance, the set of CTD vectors 206 may be provided as input to a test case generation tool configured to generate a respective corresponding test case for each CTD vector. Each vector in the set of CTD vectors 206 can define possible combinations of values of the attributes as covered by the set of test cases. Each test case in the set of test cases 210 may be designed to test the interactions among the particular combination of attribute values contained in a corresponding CTD vector of the set of CTD vectors 206. It should be appreciated that a set of CTD vectors and the corresponding test cases may, at times herein, be described and/or depicted interchangeably. For instance, the example CTD vector 300 depicted in FIG. 3 may be interchangeably thought of as the corresponding test case that tests the particular combinations of attribute values represented by the CTD vectors 300.

Each of the test cases included in the set of test cases 210 can be analyzed using the combinatorics model 205. The analysis can include a determination of a number and kind of functional attributes associated with each analyzed test case, as well as values of these attributes and their relationships. In one embodiment, at least a portion of the functional attributes of a particular CTD vector may indicate a setup activity to be performed prior to running the corresponding test case, thereby allowing distinction between different types of attributes. The test execution module 214 can determine if any of the test cases have failed to execute.

One or more illustrative embodiments of the invention are described herein. Such embodiments are merely illustrative of the scope of this invention and are not intended to be limiting in any way. Accordingly, variations, modifications, and equivalents of embodiments disclosed herein are also within the scope of this invention.

FIG. 5 is a schematic diagram of an illustrative computing device 500 configured to implement one or more example embodiments of the invention. The illustrative computing device 500 may include a server or collection of servers; a personal computer; a handheld device; or the like. While the computing device 500 and/or any particular component of the computing device 500 may be described herein in the singular, it should be appreciated that multiple instances of the computing device 500 and/or any component thereof may be provided and functionality described in connection with the computing device 500 may be distributed across multiple computing devices 500 and/or across multiple instances of any particular component of the computing device 500.

In an illustrative configuration, the computing device 500 may include one or more processors (a processing system including processor(s)) 502, a memory system including one or more memory devices 504 (generically referred to herein as memory 504), one or more input/output ("I/O") interfaces 506, one or more network interfaces 508, and data storage 512. The computing device 500 may further include one or more buses 510 that functionally couple various components of the computing device 500.

The bus(es) 510 may include at least one of a system bus, a memory bus, an address bus, or a message bus, and may permit the exchange of information (e.g., data (including computer-executable code), signaling, etc.) between various components of the computing device 500. The bus(es) 510 may include, without limitation, a memory bus or a memory controller, a peripheral bus, an accelerated graphics port, and so forth. The bus(es) 510 may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnects (PCI) architecture, a PCI-Express architecture, a Personal Computer Memory Card International Association (PCMCIA) architecture, a Universal Serial Bus (USB) architecture, and so forth.

The memory 504 may include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. Persistent data storage, as that term is used herein, may include non-volatile memory. In certain example embodiments, volatile memory may enable faster read/write access than non-volatile memory. However, in certain other example embodiments, certain types of non-volatile memory (e.g., FRAM) may enable faster read/write access than certain types of volatile memory.

In various implementations, the memory 504 may include multiple different types of memory such as various types of static random access memory (SRAM), various types of dynamic random access memory (DRAM), various types of unalterable ROM, and/or writeable variants of ROM such as electrically erasable programmable read-only memory (EEPROM), flash memory, and so forth. The memory 504 may include main memory as well as various forms of cache memory such as instruction cache(s), data cache(s), translation lookaside buffer(s) (TLBs), and so forth. Further, cache memory such as a data cache may be a multi-level cache organized as a hierarchy of one or more cache levels (L1, L2, etc.).

The data storage 512 may include removable storage and/or non-removable storage including, but not limited to, magnetic storage, optical disk storage, and/or tape storage. The data storage 512 may provide non-volatile storage of computer-executable instructions and other data. The data storage 512 can also capture historical data, data structures, test results, and other such information. The memory 504 and the data storage 512, removable and/or non-removable, are examples of computer-readable storage media (CRSM) as that term is used herein. The memory 504 and data storage 512 can be part of the same memory system or separate memory systems.

The data storage 512 may store computer-executable code, instructions, or the like that may be loadable into the memory 504 and executable by the processor(s) 502 to cause the processor(s) 502 to perform or initiate various operations. The data storage 512 may additionally store data that may be copied to memory 504 for use by the processor(s) 502 during the execution of the computer-executable instructions. Moreover, output data generated as a result of execution of the computer-executable instructions by the processor(s) 502 may be stored initially in memory 504 and may ultimately be copied to data storage 512 for non-volatile storage.

More specifically, the data storage 512 may store one or more operating systems (O/S) 514; one or more database management systems (DBMS) 516 configured to access the memory 504 and/or one or more external datastores 526; and one or more program modules, applications, engines, managers, computer-executable code, scripts, or the like such as, for example, one or more CTD vector generation modules 515; one or more test case generation modules 520; one or more test case execution modules 522; and other such modules to support testing operations. Any of the components depicted as being stored in data storage 512 may include any combination of software, firmware, and/or hardware. The software and/or firmware may include computer-executable instructions (e.g., computer-executable program code) that may be loaded into the memory 504 for execution by one or more of the processor(s) 502 to perform any of the operations described earlier in connection with correspondingly named modules/engines.

Although not depicted in FIG. 5, the data storage 512 may further store various types of data utilized by components of the computing device 500 (e.g., data stored in the datastore(s) 526). Any data stored in the data storage 512 may be loaded into the memory 504 for use by the processor(s) 502 in executing computer-executable instructions. In addition, any data stored in the data storage 512 may potentially be stored in the external datastore(s) 526 and may be accessed via the DBMS 516 and loaded in the memory 504 for use by the processor(s) 502 in executing computer-executable instructions.

The processor(s) 502 may be configured to access the memory 504 and execute computer-executable instructions loaded therein. For example, the processor(s) 502 may be configured to execute computer-executable instructions of the various program modules, applications, engines, managers, or the like of the computing device 500 to cause or facilitate various operations to be performed in accordance with one or more embodiments of the invention. The processor(s) 502 may include any suitable processing unit capable of accepting data as input, processing the input data in accordance with stored computer-executable instructions, and generating output data. The processor(s) 502 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 502 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 502 may be capable of supporting any of a variety of instruction sets.

Referring now to other illustrative components depicted as being stored in the data storage 512, the O/S 514 may be loaded from the data storage 512 into the memory 504 and may provide an interface between other application software executing on the computing device 500 and hardware resources of the computing device 500. More specifically, the O/S 514 may include a set of computer-executable instructions for managing hardware resources of the computing device 500 and for providing common services to other application programs. In certain example embodiments, the O/S 514 may include or otherwise control the execution of one or more of the program modules, engines, managers, or the like depicted as being stored in the data storage 512. The O/S 514 may include any operating system now known or which may be developed in the future including, but not limited to, any server operating system, any mainframe operating system, or any other proprietary or non-proprietary operating system.

The DBMS 516 may be loaded into the memory 504 and may support functionality for accessing, retrieving, storing, and/or manipulating data stored in the memory 504, data stored in the data storage 512, and/or data stored in external datastore(s) 526. The DBMS 516 may use any of a variety of database models (e.g., relational model, object model, etc.) and may support any of a variety of query languages. The DBMS 516 may access data represented in one or more data schemas and stored in any suitable data repository. Data stored in the datastore(s) 526 may include, for example, CTD vectors; CTD vector attributes; test case values and so forth, any portion of which may alternatively or additionally be stored in the data storage 512. External datastore(s) 526 that may be accessible by the computing device 500 via the DBMS 516 may include, but are not limited to, databases (e.g., relational, object-oriented, etc.), file systems, flat files, distributed datastores in which data is stored on more than one node of a computer network, peer-to-peer network datastores, or the like.

Referring now to other illustrative components of the computing device 500, the input/output (I/O) interface(s) 506 may facilitate the receipt of input information by the computing device 500 from one or more I/O devices as well as the output of information from the computing device 500 to the one or more I/O devices. The I/O devices may include any of a variety of components such as a display or display screen having a touch surface or touchscreen; an audio output device for producing sound, such as a speaker; an audio capture device, such as a microphone; an image and/or video capture device, such as a camera; a haptic unit; and so forth. Any of these components may be integrated into the computing device 500 or may be separate. The I/O devices may further include, for example, any number of peripheral devices such as data storage devices, printing devices, and so forth.

The I/O interface(s) 506 may also include an interface for an external peripheral device connection such as universal serial bus (USB), FireWire, Thunderbolt, Ethernet port or other connection protocol that may connect to one or more networks. The I/O interface(s) 506 may also include a connection to one or more antennas to connect to one or more networks via a wireless local area network (WLAN) (such as Wi-Fi) radio, Bluetooth, and/or a wireless network radio, such as a radio capable of communication with a wireless communication network such as a Long Term Evolution (LTE) network, WiMAX network, 3G network, etc.

The computing device 500 may further include one or more network interfaces 508 via which the computing device 500 may communicate with any of a variety of other systems, platforms, networks, devices, and so forth. The network interface(s) 508 may enable communication, for example, with one or more other devices via one or more of networks. Such network(s) may include, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. Such network(s) may have any suitable communication range associated therewith and may include, for example, global networks (e.g., the Internet), metropolitan area networks (MANs), wide area networks (WANs), local area networks (LANs), or personal area networks (PANs). In addition, such network(s) may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

It should be appreciated that the program modules/engines depicted in FIG. 5 as being stored in the data storage 512 are merely illustrative and not exhaustive and that processing described as being supported by any particular module may alternatively be distributed across multiple modules, engines, or the like, or performed by a different module, engine, or the like. In addition, various program module(s), script(s), plug-in(s), Application Programming Interface(s) (API(s)), or any other suitable computer-executable code hosted locally on the computing device 500 and/or other computing devices may be provided to support functionality provided by the modules depicted in FIG. 5 and/or additional or alternate functionality. Further, functionality may be modularized in any suitable manner such that processing described as being performed by a particular module may be performed by a collection of any number of program modules, or functionality described as being supported by any particular module may be supported, at least in part, by another module. In addition, program modules that support the functionality described herein may be executable across any number of cluster members in accordance with any suitable computing model such as, for example, a client-server model, a peer-to-peer model, and so forth. In addition, any of the functionality described as being supported by any of the modules depicted in FIG. 5 may be implemented, at least partially, in hardware and/or firmware across any number of devices.

It should further be appreciated that the computing device 500 may include alternate and/or additional hardware, software, or firmware components beyond those described or depicted without departing from the scope of the invention. More particularly, it should be appreciated that software, firmware, or hardware components depicted as forming part of the computing device 500 are merely illustrative and that some components may not be present or additional components may be provided in various embodiments. While various illustrative modules have been depicted and described as software modules stored in data storage 512, it should be appreciated that functionality described as being supported by the modules may be enabled by any combination of hardware, software, and/or firmware. It should further be appreciated that each of the above-mentioned modules may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other modules. Further, one or more depicted modules may not be present in certain embodiments, while in other embodiments, additional program modules and/or engines not depicted may be present and may support at least a portion of the described functionality and/or additional functionality.

One or more operations of the method 400 may be performed by one or more computing devices 500 having the illustrative configuration depicted in FIG. 5, or more specifically, by one or more program modules, engines, applications, or the like executable on such a device. It should be appreciated, however, that such operations may be implemented in connection with numerous other device configurations.

The operations described and depicted in the illustrative method of FIG. 4 may be carried out or performed in any suitable order as desired in various example embodiments of the invention. Additionally, in certain example embodiments, at least a portion of the operations may be carried out in parallel. Furthermore, in certain example embodiments, less, more, or different operations than those depicted in FIG. 4 may be performed.

Although specific embodiments of the invention have been described, one of ordinary skill in the art will recognize that numerous other modifications and alternative embodiments are within the scope of the invention. For example, any of the functionality and/or processing capabilities described with respect to a particular system, system component, device, or device component may be performed by any other system, device, or component. Further, while various illustrative implementations and architectures have been described in accordance with embodiments of the invention, one of ordinary skill in the art will appreciate that numerous other modifications to the illustrative implementations and architectures described herein are also within the scope of this invention. In addition, it should be appreciated that any operation, element, component, data, or the like described herein as being based on another operation, element, component, data, or the like may be additionally based on one or more other operations, elements, components, data, or the like. Accordingly, the phrase "based on," or variants thereof, should be interpreted as "based at least in part on."

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

One or more of the methods described herein can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

In some embodiments, various functions or acts can take place at a given location and/or in connection with the operation of one or more apparatuses or systems. In some embodiments, a portion of a given function or act can be performed at a first device or location, and the remainder of the function or act can be performed at one or more additional devices or locations.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The present disclosure has been presented for purposes of illustration and description, but is not intended to be exhaustive or limited to the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The diagrams depicted herein are illustrative. There can be many variations to the diagram or the steps (or operations) described therein without departing from the spirit of the disclosure. For instance, the actions can be performed in a differing order or actions can be added, deleted or modified. Also, the term "coupled" describes having a signal path between two elements and does not imply a direct connection between the elements with no intervening elements/connections therebetween. All of these variations are considered a part of the present disclosure.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method for optimizing parameter lists used for cybersecurity testing, the method comprising:
   receiving test objective data indicating an objective to be achieved during a cybersecurity test of a target system;
   generating an attack tree by processing the test objective data into attack tree data comprising a plurality of data parameter sets and links between data parameter sets;
   analyzing complexity of the attack tree based on the test objective data using a combinatorics model; and
   reducing the attack tree to achieve the objective of the cybersecurity test based on the analyzed complexity of the attack tree.

2. The method of claim 1, wherein the attack tree comprises a combination of two or more attack vectors for attacking the target system.

3. The method of claim 1, wherein a parameter list length of the parameter lists is limited to a maximum length included in the test objective data.

4. The method of claim 1, wherein generating the attack tree further comprises:
   performing parameter list testing and target register testing for a plurality of locations in the parameter list and a plurality of target registers to generate the attack tree.

5. The method of claim 4, wherein generating the attack tree further comprises:
   performing parameter list depth testing progressively through a plurality of nested levels of parameter areas.

6. The method of claim 5, wherein the parameter list depth testing is limited to a maximum depth included in the test objective data.

7. The method of claim 6, wherein analyzing the complexity further comprises analyzing at least one of a depth of the attack tree, analyzing a breadth of the attack tree, and analyzing a shape of the attack tree.

8. The method of claim 1, wherein reducing the attack tree reduces a number of tests needed to be run on each program call, supervisor call, or branch associated with one or more of a plurality of authorized services of the target system.

9. A system comprising:
   a memory system; and
   a processing system operably coupled to the memory system, the processing system configured to execute a plurality of instructions stored on the memory system to perform a plurality of operations comprising:
      receiving test objective data indicating an objective to be achieved during a cybersecurity test of a target system;
      generating an attack tree by processing the test objective data into attack tree data comprising a plurality of data parameter sets and links between data parameter sets;
      analyzing complexity of the attack tree based on the test objective data using a combinatorics model; and
      reducing the attack tree to achieve the objective of the cybersecurity test based on the analyzed complexity of the attack tree.

10. The system of claim 9, wherein the attack tree comprises a combination of two or more attack vectors for attacking the target system.

11. The system of claim 9, wherein a parameter list length of the parameter lists is limited to a maximum length included in the test objective data.

12. The system of claim 9, wherein generating the attack tree further comprises:
   performing parameter list testing and target register testing for a plurality of locations in the parameter list and a plurality of target registers to generate the attack tree.

13. The system of claim 12, wherein generating the attack tree further comprises:
   performing parameter list depth testing progressively through a plurality of nested levels of parameter areas.

14. The system of claim 13, wherein the parameter list depth testing is limited to a maximum depth included in the test objective data.

15. The system of claim 14, wherein analyzing the complexity further comprises analyzing at least one of a depth of the attack tree, analyzing a breadth of the attack tree, and analyzing a shape of the attack tree.

16. The system of claim 9, wherein reducing the attack tree reduces a number of tests needed to be run on each program call, supervisor call, or branch associated with one or more of a plurality of authorized services of the target system.

17. A computer program product comprising one or more computer readable storage media having program instructions embodied therewith, the program instructions executable to perform a plurality of operations comprising:
   receiving test objective data indicating an objective to be achieved during a cybersecurity test of a target system;
   generating an attack tree by processing the test objective data into attack tree data comprising a plurality of data parameter sets and links between data parameter sets;
   analyzing complexity of the attack tree based on the test objective data using a combinatorics model; and
   reducing the attack tree to achieve the objective of the cybersecurity test based on the analyzed complexity of the attack tree.

18. The computer program product of claim 17, wherein the attack tree comprises a combination of two or more attack vectors for attacking the target system, and the target system comprises a plurality of authorized services.

19. The computer program product of claim 17, wherein generating the attack tree further comprises:
   performing parameter list testing and target register testing for a plurality of locations in the parameter list and a plurality of target registers to generate the attack tree; and
   performing parameter list depth testing progressively through a plurality of nested levels of parameter areas, wherein the parameter list depth testing is limited to a maximum depth included in the test objective data, and analyzing the complexity further comprises analyzing at least one of a depth of the attack tree, analyzing a breadth of the attack tree, and analyzing a shape of the attack tree.

20. The computer program product of claim 17, wherein reducing the attack tree reduces a number of tests needed to be run on each program call, supervisor call, or branch associated with one or more of a plurality of authorized services of the target system.

* * * * *